United States Patent [19]

Anagnostopoulos

[11] Patent Number: 5,227,835
[45] Date of Patent: Jul. 13, 1993

[54] TEACHABLE CAMERA

[75] Inventor: Constantine N. Anagnostopoulos, Mendon, N.Y.

[73] Assignee: Eastman Kodak Company, Rochester, N.Y.

[21] Appl. No.: 631,517

[22] Filed: Dec. 21, 1990

[51] Int. Cl.⁵ .............................................. G03B 7/00
[52] U.S. Cl. ................................ 354/412; 354/289.12
[58] Field of Search ............................ 354/412, 289.12

[56] References Cited

U.S. PATENT DOCUMENTS

| | | | |
|---|---|---|---|
| 4,853,733 | 8/1989 | Watanabe et al. | 354/412 |
| 4,855,779 | 8/1989 | Ishikawa et al. | 354/412 |
| 4,887,115 | 12/1989 | Inoue et al. | 354/412 |
| 4,965,443 | 10/1990 | Yamasaki et al. | 354/402 |
| 4,978,990 | 12/1990 | Yamasaki et al. | 354/412 |

OTHER PUBLICATIONS

H. P. Graf and L. D. Jackel, "Analog Electronics Neural Network Circuits", Jul. 1989, *IEEE Circuits and Devices Magazine*, pp. 44-55.
The Handbook of Artificial Intelligence, pp. 177-199.

Primary Examiner—David M. Gray
Attorney, Agent, or Firm—Edward Dugas

[57] ABSTRACT

A teachable camera 8 which includes an alterable template matching neural network 40 positioned between a microprocessor 10 that performs camera picture taking algorithms and the units 24-32 such as the shutter which control the characteristics of the picture. The network 40 alters the output of the algorithms to match the picture characteristics desired by the photographer. The network 40 is altered by a rule based expert system executing in a personal computer 70 which determines how to alter the matching template of the network 40.

20 Claims, 5 Drawing Sheets

TEACHABLE CAMERA

BACKGROUND OF THE INVENTION

1. Field of the Invention

The present invention is directed to a camera which a photographer can teach to take pictures as desired, and more particularly, to a camera in which a neural network, capable of learning the preferences of a photographer, changes camera control algorithms to match the photographer's desires.

2. Description of the Related Art

In automated or electronic cameras, sensors and circuits within the camera evaluate the scene to be photographed and determine, among other parameters, the proper focus, whether the flash should be activated, the exposure time, etc. To make these determinations the camera depends on hard wired or software algorithms resident within the camera. These algorithms have been developed by the camera designer and are based on statistical studies of many photographs taken by a random collection of amateur photographers. The primary shortcoming of this approach is that the camera algorithm, while valid on the average, is not generally optimum for each individual user or situation. There are cameras as described in U.S. Pat. No. 4,855,779 which allow the user to change the picture taking algorithm by replacing an electronic board within the camera. Changing camera components, such as an electronic board, is similar to having a manual camera. The shortcomings of this second approach is that the photographer must not only be technically knowledgeable about cameras and camera algorithms, but also in the taking of photographs. This approach also limits the photographer to a few fixed camera algorithms.

SUMMARY OF THE INVENTION

It is an object of the present invention to provide a camera which will adapt to a photographer's needs.

It is also an object of the present invention to allow all photographers to control cameral picture taking algorithms.

It is a further object of the present invention to provide a camera which learns how to take desired pictures.

It is another object of the present invention to provide a camera controlled by a neural network.

The above objects can be accomplished by a camera which includes a neural network that alters the camera picture taking algorithms based on user inputs concerning the desired characteristics of photographs.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

A teachable camera in accordance with the present invention allows a photographer a number of camera algorithmic changes, without manual intervention and without the need for the photographer to be aware of camera functions or to be knowledgeable about the technology of picture taking. By interfacing the camera to a computer, an amateur photographer can teach the camera to take photographs that are pleasing to the photographer. The computer interface to the cameras for making algorithmic changes is also of use to more experienced photographers.

A teachable camera is one which for the same set of inputs can produce many different sets of outputs. The camera learns to produce a preferred set of camera settings in certain situations. This behavior is similar to that of the brain.

In all cameras equipped with automatic focussing, the lens is set to produce the sharpest focus possible. However, in situations where closeup portrait photographs are taken, it is preferable to achieve a soft focus, which means that the lens of the camera must be set slightly out of focus. The following example will show how a camera has to be modified so that whenever a closeup portrait is taken the focus is altered to cause the image to be slightly out of focus.

Figure 1:
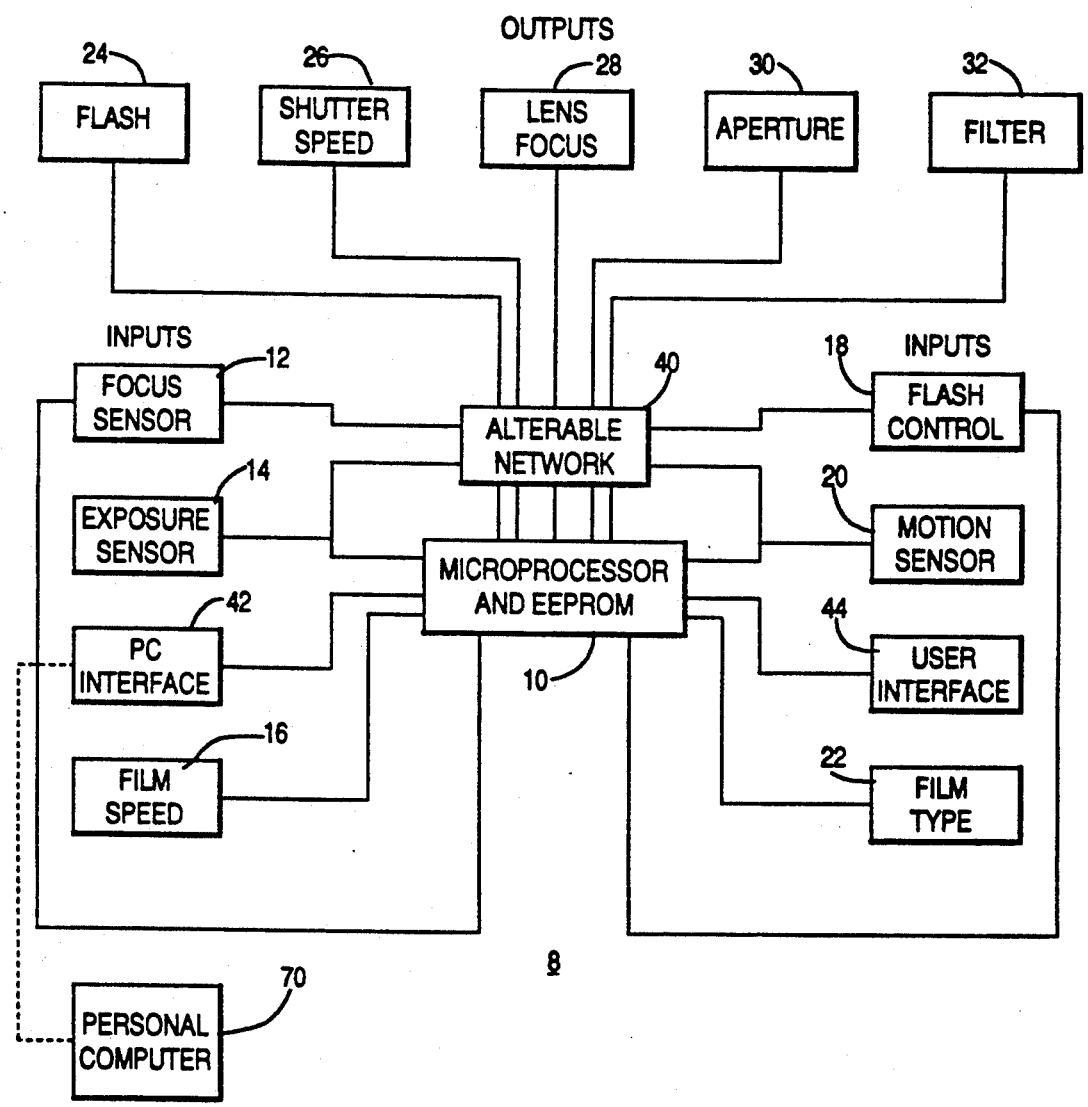
FIG. 1 illustrates the architecture of a teachable camera in accordance with the present invention.

FIG. 1 shows a block diagram of a camera 8 that includes a conventional microprocessor 10, such as a 688C805B6 available from Motorola for controlling the camera 8 and which includes a nonvolatile programmable memory where the camera algorithms are stored. The conventional microprocessor 10 receives inputs from a conventional focus sensor 12, a conventional exposure sensor 14, a conventional film speed indicator 16, a conventional flash control unit 18, a conventional motion sensor 20 and a conventional film type indicator 22. In a conventional camera the microprocessor 10, based on inputs from these devices and the results of the conventional camera picture taking algorithms, controls the picture characteristic units which control the characteristics of the picture and include a flash unit 24, a shutter speed control unit 26, a lens focus unit 28, and aperture unit 30 and possibly any filters 32 which may be attached to the camera. However, in the present invention an alterable neural network is positioned between the microprocessor 10 and the picture characteristic units 24–32. This alterable network 40, as will be discussed in more detail later, changes the outputs of the picture algorithm of the microprocessor 10 and allows image defocusing in closeup portrait situations.

The alteration of the network 40 is performed through the microprocessor 10 from either a personal computer interface 42 or a user interface 44 included on the camera 8. The user interface 44 would typically be the conventional liquid crystal display and numerical keyboard which are provided on today's more sophisticated cameras. The alterable network includes subsystems for focus control, aperture control, shutter control and flash control where the input parameters for controlling the devices can overlap. For example, aperture and shutter speed are inter-related and the network subsystems for controlling the shutter speed and aperture units include common inputs. A more detailed description of the focus altering subsystem is illustrated in FIG. 2.

Figure 2:
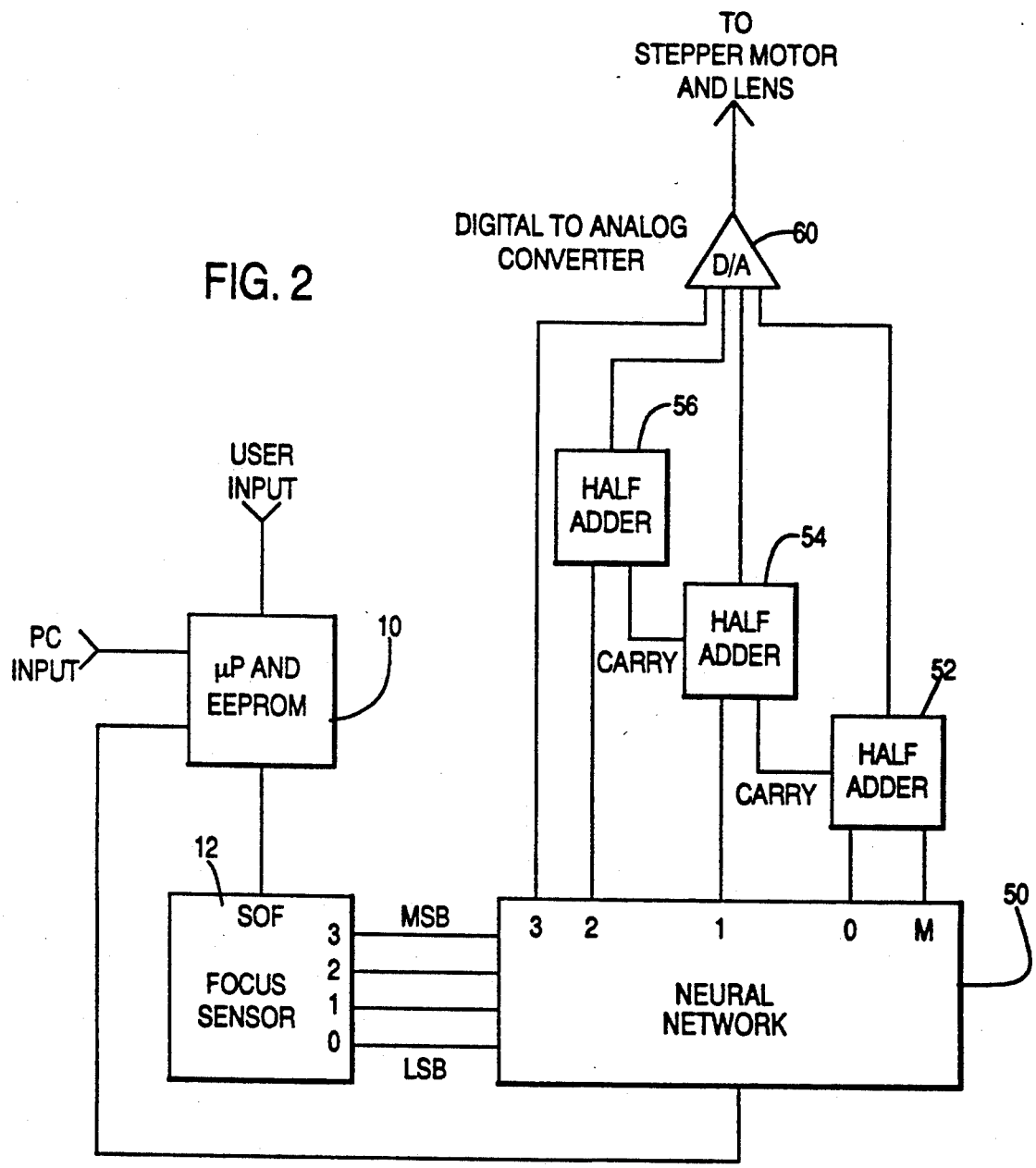
FIG. 2 illustrates a design for altering camera focus.

In the embodiment illustrated in FIG. 2 the focus sensor 12 is of the range finding type and when it completes the processing for determining subject focus, as initiated by the microprocessor, the focus sensor 12 outputs a four bit binary code which identifies the range of the subject. Other types of focus sensors are of course possible. In the present embodiment, the code produced by the sensor represents one of 16 possible zones within which the subject is found to reside. The four bit code is fed to a VLSI neural network circuit 50, more details of which will be described with respect to FIG. 3 and the construction of which is described in Analog VLSI and Neural Systems by C. Meade, New York, Addison Lesley, 1989, incorporated by reference herein. The subject is at a closeup range if the subject is found in zones 1 through 4. The algorithm that is needed to produce the slightly out of focus situation is then as follows: 1. In a case where the two most significant bits (bits 2 and 3) from the focus sensor 12 are zero (an AND function), add 1 to the range value. 2. In all other cases add a zero. Thus, the function of the neural network 50 is to generate a 1 or a 0 for bit M as shown in FIG. 2 when the two most significant bits are zero. The value of M is then added to the four bit number from the focus sensor 12 by three half adders 52, 54 and 56 and the final code is provided to a digital-to-analog converter 60 and converted into an analog voltage that drives a conventional lens stepper motor. Although this example adds one to the range value, it is also possible to subtract one from the range value.

Figure 3:
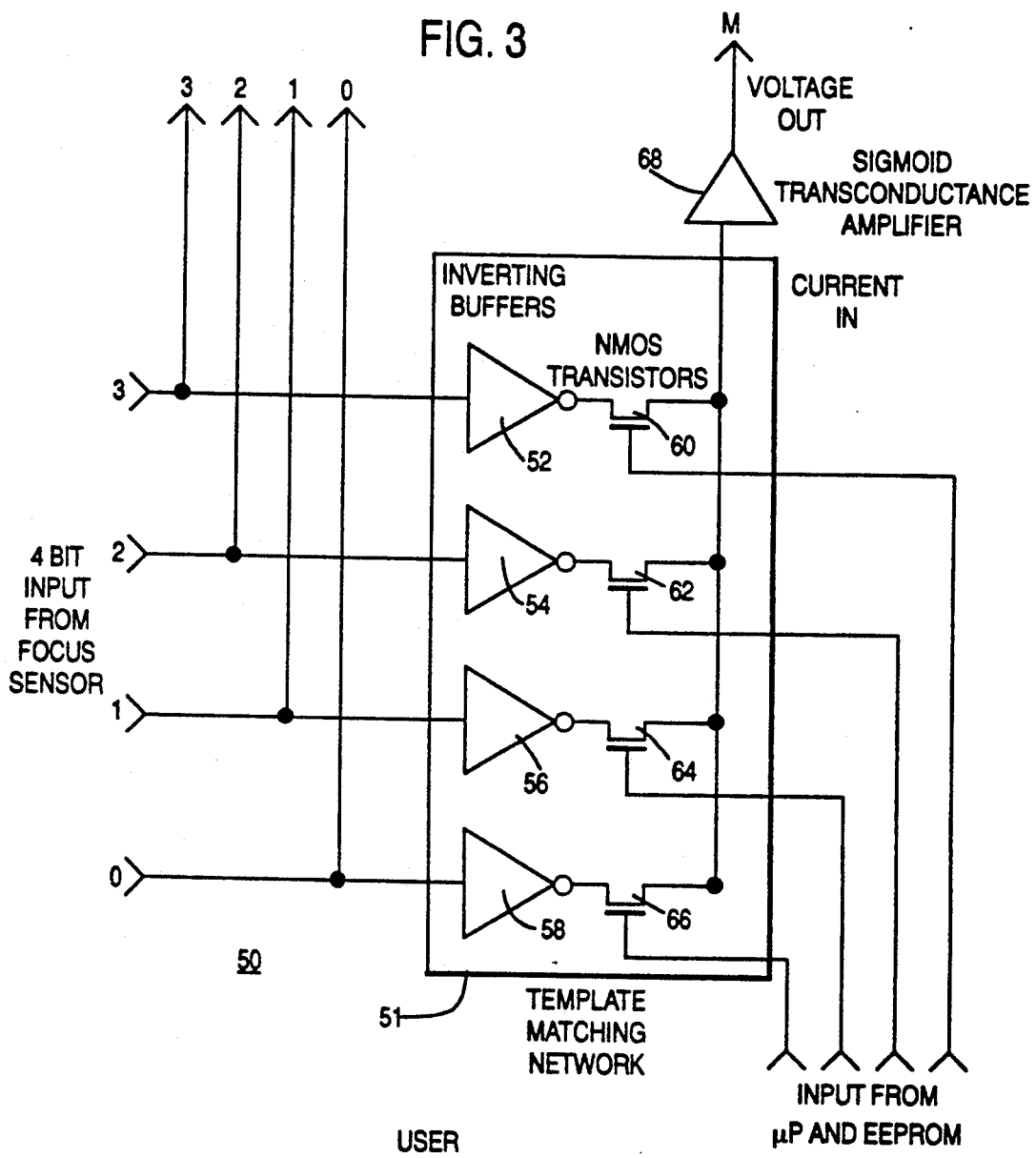
FIG. 3 depicts a template matching neural network for focus alternation.

FIG. 3 illustrates the neural network 50 preferred by the present invention for focus control and is a template matching type neural network as described in "Analog Electronic Neural Networks" by Garf et al. *IEEE Circuits and Devices Maoazine*, p. 44–55., July 1989, incorporated by reference herein. However, it is well within the skill of those of ordinary skill in the art to substitute a different type of neural network for the template matching type preferred here. The 4 bits from the autofocus sensor 12, in the network 51, are connected to inverting buffers 52–58, the outputs of which are provided to NMOS transistors 60–66. The outputs of all the transistors 60–66 connect to a common node and to a conventional sigmoid transconductance amplifier 68. The gate of each transistor is controlled by the microprocessor 50. During the teaching phase, to be discussed in more detail later, instructions have been stored in the microprocessor memory indicating that the gates of the two most significant bits should be biased high, that is, turned on, while the gates of the two least significant bits should biased low. Alternately, if the transistors were of the floating gate type, they would have been programmed during the teaching phase. Because the common node of the transistors is connected to the input of the transconductance amplifier 68 when bits 2 and 3 are both zero, both NMOS transistors 60 and 62 contribute to the input current to the amplifier 68. Whenever the current supplied to amplifier 68 is high, amplifier 68 produces an output ("1") and when low produces no output ("0"). However, if either bit is not zero, the current contributed by one of the transistors is removed by the other. The transistors of the other bits are off and they do not contribute any current to the amplifier 68. As discussed previously the amplifier 68 preferred is sigmoid type rather than a very high gain differential pair to allow for some mismatching between the transistors of the most significant bits when one is removing the contribution of the other. The template matching network of FIG. 3 produces a value of I for M when both the high order bits are 0 and 0 when either or both of these bits are 1. In this case, the amount of defocusing amounts to advancing the lens at least one significant bit or one zone. Of course, different templates could implement different algorithms such as subtracting one bit or adding two bits.

Those familiar with digital circuit design can easily find other circuits that will implement the above algorithm equally well. Neural networks are certainly not the only way to alter the camera algorithms. However, neural networks are the preferable way of implementing changes in the camera controls. The reason is that since the two most basic characteristics of a neural network are pattern matching and learning, they are the most suitable types of circuits for a teachable camera, designed to learn the pattern of the desires of the photographer. Another benefit in using neural networks to implement all of the changes in control of the camera is that neural networks are faster as compared to the current control by using a microprocessor, since in neural networks all of the calculations are done simultaneously. Finally, the camera can be equipped with an external default switch which the photographer can activate to remove the pattern matching function which matches for a portrait picture pattern. In the above example, the default switch would cause the microprocessor 10 to send a zero voltage to the gates of all transistors 52–58 of the template matching network and this will produce a zero current into the input of the amplifier 68 for all inputs from the focus sensor 12 and consequently a value of zero for M in all situations, thereby turning off the template matching and focus algorithm altering features of the present invention.

As previously discussed, to interface with the teachable camera, a user interface 44, which could be the conventional buttons and display of the camera, could be used. However, given that computers in general, and personal computers in particular, are becoming very common, it would be much more convenient to interface the camera to a personal computer 70. A simple personal computer interface 42 based on an RS232 type serial interface, similar to the ones used for keyboards, would be appropriate. Having a computer 70 will allow much more complex software to be utilized in the teaching process and would not require extra circuits and software to reside within the camera, thereby keeping the camera cost down. As shown in FIG. 1 the personal computer 70 communicates through the interface 42 to the camera microprocessor 10 which in turn writes into its own memory the required code.

As previously discussed, the present invention is primarily aimed at the amateur photographer who has no technical knowledge about cameras or picture taking. As a result, the program in the personal computer 70 must be constructed so that it asks questions in plain English and translates the responses into technical terms that can then be further translated into instructions for in the camera 8. It is of course obvious that this methodology can extended to technically knowledgeable photographers who can directly input instructions into the personal computer 70 for compilation and downloading into the camera microprocessor 10. Any suitable computer language can be used to generate the questions to the photographer and compile the answers, however, an expert system language as discussed later is preferred.

The teaching process begins with the photographer shooting a number of scenes, having the film developed, connecting the camera 8 to the personal computer 70 and beginning the evaluation process. As the photographer picks up the photographs one by one, the personal computer 70 asks a number of questions attempting to find out whether the photographer is pleased with the result and if not determine the camera settings the next time a similar scene is photographed. One extra task the teachable camera 8 has to perform, compared to present day cameras, is to store in the memory of the microprocessor the settings, for example, subject distance (which is the focus), aperture setting, flash (direct or bounced or both), and the others for each photograph. A simple modification to the programs of the camera would allow the microprocessor 10 to store these settings in the EEPROM or some other suitable memory. During the evaluation process the personal computer 70 would then access that data. In the case of an electronic camera, this process is further simplified in some instances since the photograph can be displayed immediately after the photograph is taken and the camera need not store settings for each photograph.

Consider the example above in which the photographer likes to take portraits, and although not able to articulate it in technical terms, he would prefer that his subject be slightly out of focus. It is the job of the computer program in the personal computer 70 to figure out that the photographer would like his portrait slightly out of focus, by examining the camera setting for each photograph and by asking the photographer a series of leading questions. Programs such as this are presently available and are generally artificial intelligence rule based type programs. They are applied in a variety of situations including the more complicated task of medical diagnosis, as described in the Handbook of Artificial Intelligence, by Bar et al. Stanford: Huris Technical Press, 1980, Vol 2, page 177-192 incorporated by reference herein. In medical diagnosis, for example, and similar to the present situation the program receives hard facts, such as lab data and the doctor's observations and the patient's description of the symptoms, which are typically not very well articulated. The program then arrives at a diagnosis by following one of various types of algorithms, such as the production of rules augmented by certainty factors described in Bar et al., The Handbook of Artificial Intelligence, Stanford: Huris Technical Press, 1981, Vol. 1, pp. 190-191 also incorporated by reference herein.

After the photographer has connected the camera 8 to the computer 70 and loaded the appropriate program, the following interchange between the computer 70 and the photographer could take place: Computer: Are you pleased with photograph No. 1? Photographer: No. The computer then examines the camera settings for photograph number 1 and finds that the focus indicates a subject distance consistent with a portrait situation. Computer: Is the subject in the center of the picture a person or an object? Photographer: Person. If it were not a person the computer would have to make different assumptions as to the reason that the picture is not acceptable. Computer: Is the persons face washed out or blurry? Photographer: No. If the photographer had answered yes, the Computer Would have to examine whether the exposure time was too long compared to the flash time length, which would indicate a camera malfunction. Otherwise, the computer would assume that the photographer shook the camera while taking the picture and would respond with a suggestion to use a tripod the next time such pictures are taken. Computer: Are all the facial features clearly visible? Photographer: Yes. Computer: Are the eyelashes and other facial hair clearly visible? Photographer: Yes. Computer: Are small wrinkles and even skin pores visible? Photographer: Yes. Computer: Would you prefer if they were not? Photographer: Yes. At this point, the program has enough information to download instructions to the microprocessor 10 in the camera, so that the memory in the microprocessor 10 is loaded with the required data so that the next time a portrait situation arises, the neural network output M takes the value of one.

The above example involved changing the output of the camera picture taking algorithm based on the input from a single sensor. However, as mentioned previously a modification to the output of the camera picture taking algorithm based on the inputs of plural sensors is possible. For example, let us consider the situation where the photographer takes nature scenes with a person usually included. In this situation the photographer would have to teach his camera to use the smallest possible aperture, that is, the highest F-stop, every time nature shots are taken so that both the subject as well as the background or other natural objects of the picture are in focus. To determine the aperture setting and the shutter speed, the microprocessor 10 in the camera 8 finds all possible solutions to the equation $B=(KA**2)/(TS)$, where B is the scene brightness in foot lamberts (fl) as determined by the light sensor 14, K is a constant, A is the F-stop, that is 11 for F/11, T is the shutter speed in seconds and S is the film ASA number. The microprocessor can then find all possible pairs of A and T that satisfy the above equation for the particular camera. For a camera where the value of K equals 3.91, ASA equals 100 and the maximum F-stop is 32, the pairs of A, T calculated are: (2.8, 1/60), (4, 1/30), (5.6, 1/15), (8, 0.125), (11, 0.250), (16, 0.25), (22, 1), and (32,2).

Figure 4:
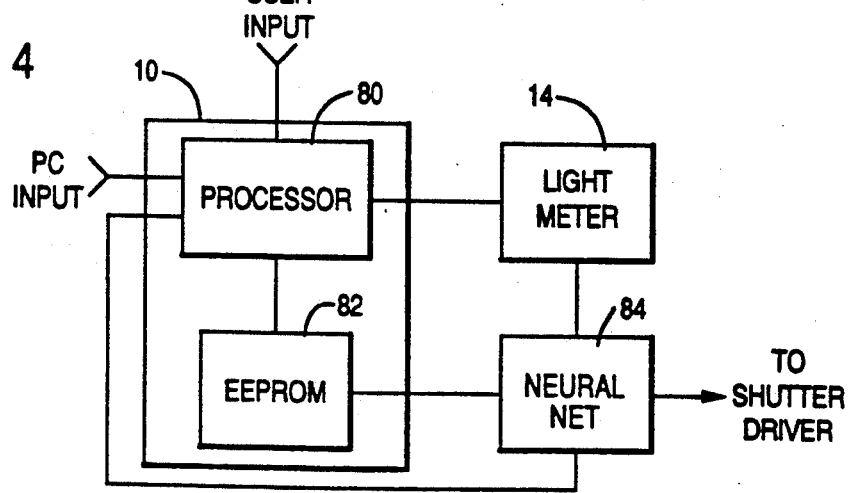
FIG. 4 illustrates a design for F-stop or aperture selection.

One feature of nature scenes that can be used to identify them is their high light level, generally above 250 foot lamberts. During the teaching process, the microprocessor 10 is instructed to store in EEPROM the maximum F-stop along with the corresponding shutter speed whenever the light meter reading exceeds, for example, 255 foot lamberts. Conversely, if the photographer's intent is to have his subject at a sharp focus and a background blurry, then the microprocessor 10 would load the smallest possible F-stop into the microprocessor memory. A block diagram of a system for accomplishing these tasks is shown in FIG. 4.

Figure 5:
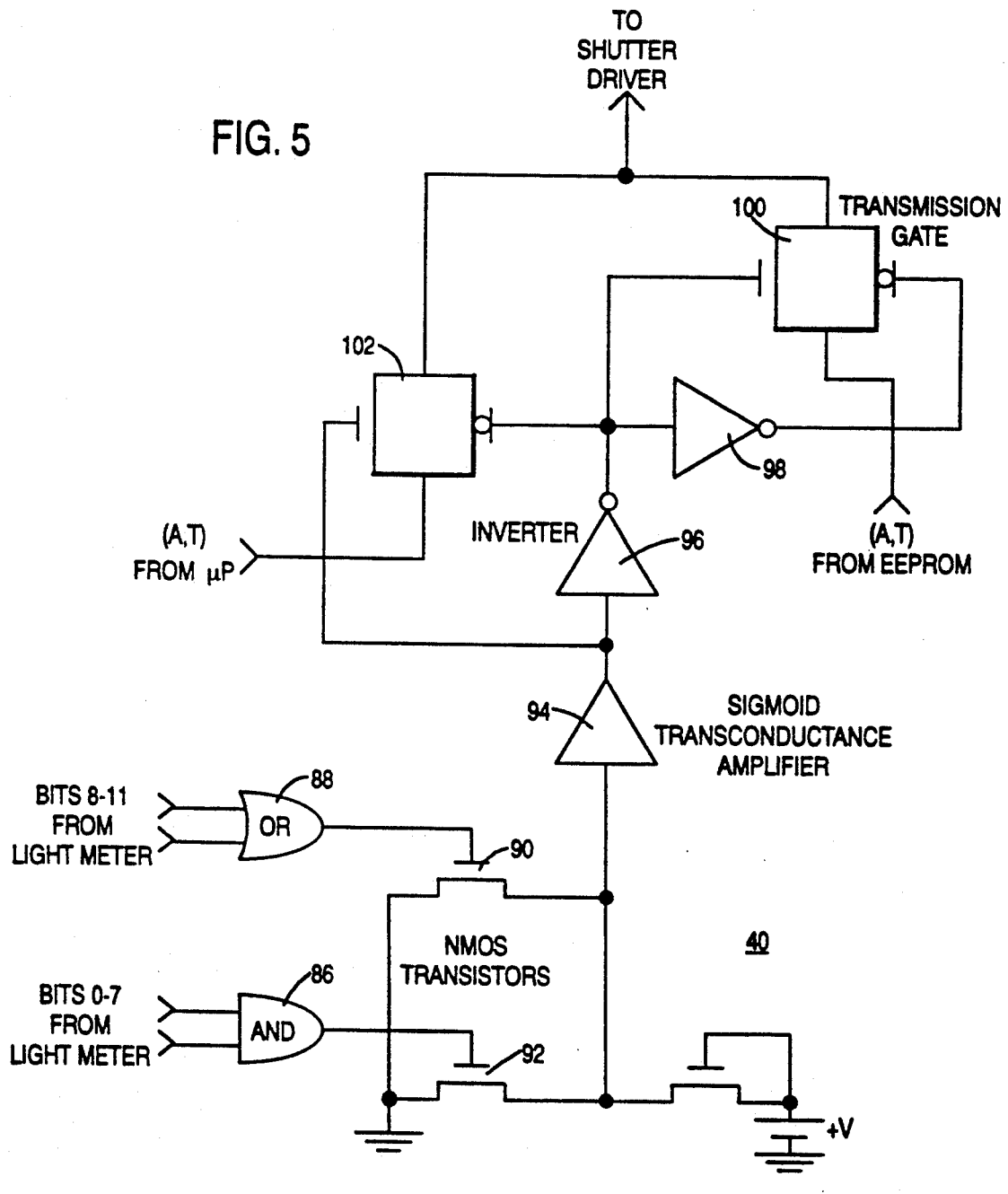
FIG. 5 illustrates a template matching neural network for F-stop selection.

During the operation, as shown in FIG. 5 a 12 bit word from the light meter 14 corresponding to 1028 different light levels is split into two groups. The first bits consisting of group 0-7 are input to a template matching network which includes buffers, transistors and an amplifier which perform the function of an 8 bit AND gate 86. This function can be performed by inverting buffers etc. like those performing the AND operation of bits 2 and 3 in FIG. 5. The other bits 8-11 are input to the network which performs the function of a 5 input OR gate 88. Thus, when the light level is 255 or more (the pattern to be matched by the template matching network), either the AND gate or the OR gate will be 1. This will cause at least one of the two NMOS transistors 90 and 92 to conduct and bring the input of a sigmoid amplifier 94 to zero. This in turn, through the inverters 96 and 98, makes the transmission gate 100 conduct while keeping the transmission gate 102 in the off state. Thus, the A aperture and T shutter speed values transmitted to the shutter driver will be those coming from the EEPROM 10 which will have the highest F-stop calculated and the corresponding shutter speed. If the number output by the light meter 14 is less than 255, then both NMOS transistors 90 and 92 will be off causing the amplifier 94 to be high, which in turn will make the transmission gate 102 conductive and thus transmit to the shutter driver values of A and T determined by the microprocessor 10. The teaching process in this situation would indicate to the microprocessor 10 that the f-stop/shutter speed pair stored is based on the largest f-stop if the photographer desires to have the background sharp and the smallest f-stop if the background should be blurry.

Taking the embodiment of FIG. 5 one step further it is possible to provide an additional template matching neural segment which will determine whether the maximum f-stop matches the calculated f-stop and if not, in a manner similar to the increase in the range setting previously discussed, set the f-stop up one setting and the shutter speed down one setting. This would allow the camera to adjust to less than the maximum and to only slightly decrease the sharpness of the background elements.

Figure 6:
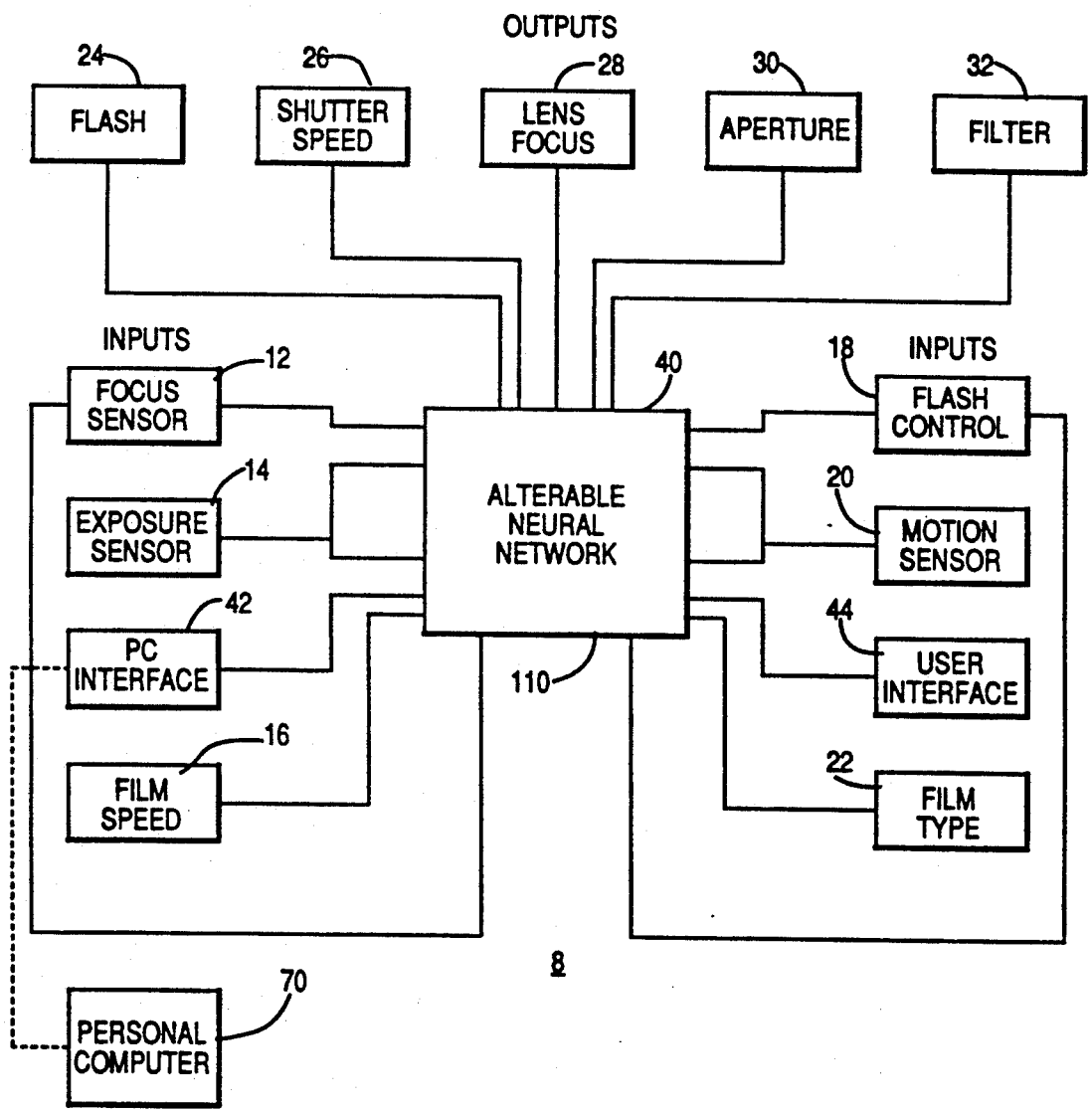
FIG. 6 illustrates a neural network controlled camera.

FIG. 6 illustrates a further embodiment of the present invention. In this embodiment a pattern matching neural network 110 is substituted for the microprocessor 10 and network 40 of FIG. 1. In this embodiment pattern matching segments for each of the picture taking algorithms in the microprocessor 10 are provided as well as pattern matching segments corresponding to the features of the network 40.

A camera system has been described which includes a conventional film or electronic camera that is augmented with alterable neural networks or completely controlled by the neural network, and an interface to a computer, and a computer that can accept the interface to the camera and which includes software resident in the computer that is of the artificial intelligence type. This camera system will be of most use to amateur photographers. The concept, however, can be extended to the use by knowledgeable photographers who will change their camera algorithms to optimize them for the scenes which they are photographing, and by professionals in studio or similar settings to have the computer make all the camera settings, based on instructions they issue to the computer, so that they do not have to do all the camera settings manually. The description of the alterable network architecture and related circuit diagrams and the artificial intelligence program provide examples in which soft focus portraits and landscape photographs are taken. There are, however, many more situations in which the invention could be used to produce more pleasing photographs for amateur photographers. For example, by altering the exposure and direct vs bounce flash algorithms, faces can be made to come out darker or lighter than their actual tone. Because the camera control is implemented using neural nets, the time to calculate the camera settings is reduced compared to microprocessor controlled cameras and this is beneficial in many instances, such as when attempting to photograph a fast moving object. As previously mentioned, the invention may be applied to either film or electronic still or movie cameras. In electronic cameras algorithm altering can be done dynamically, by viewing the captured image on a television screen as the picture is taken and altering the network immediately thereafter using the personal computer.

The many features and advantages of the invention are apparent from the detailed specification and thus it is intended by the appended claims to cover all such features and advantages which fall within the true spirit and scope thereof. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

What is claimed is:

1. A control system for a camera including an input sensor and a picture characteristic transducer, the transducer controlling a characteristic of a taken picture responsive to at least one of plural exposure control parameters, said control system comprising:

calculation means, connected to the input sensor, for receiving an input from the input sensor and calculating the exposure control parameters for controlling the picture characteristic transducer; and means, connected between said calculation means and the picture characteristic transducer, for altering the exposure control parameters to produce a different exposure control parameters for the picture characteristic transducer responsive to desired picture characteristics supplied by a user and directly controlling the picture characteristic transducer with at least one of the different exposure control parameters.

2. A control system for a camera including an input sensor and a picture characteristic transducer, the transducer controlling a characteristic of a taken picture, said control system comprising:

calculation means, connected to the input sensor, for receiving an input from the input sensor and calculating a value for controlling the picture characteristic transducer; and means, connected between said calculation means and the picture characteristic transducer, for altering the value to produce a different value for the picture characteristic transducer responsive to desired picture characteristics supplied by a user and directly controlling the picture characteristic transducer with the different value, said means for altering comprising a neural network directly connected to the input sensors, said calculation means and the picture characteristic transducer.

3. A system as recited in claim 2, further comprising teaching means for modifying said neural network responsive to desired picture characteristics provided by the camera user.

4. A control system for a camera including a focus sensor producing a focus setting and a picture characteristic focus transducer controlling a characteristic of a taken picture responsive to a focus control parameter, said control system comprising:

calculation means, connected to the focus sensor, for receiving the focus setting from the focus sensor and determining an output focus control parameter for the picture characteristic focus transducer; and means, connected between said calculation means and the picture characteristic focus transducer, for altering the output focus control parameter to produce an altered output focus control parameter for the picture characteristic focus transducer responsive to desired picture characteristics supplied by a user, said means for altering comprising a template matching neural network connected to said focus sensor and altering the output focus when the focus setting matches a target focus.

5. A control system for a camera including a light meter and a picture characteristic unit controlling a characteristic of a taken picture, said control system comprising:

calculation means, connected to the input sensor, for receiving an input from the input sensor and determining an output for the picture characteristic unit, said calculation means producing a calculated aperture setting and a calculated shutter speed setting and an optimized aperture setting and an optimized shutter speed setting both optimized for a desired picture characteristic; and means, connected between said calculation means and the picture characteristic unit, for modifying the output for the picture characteristic unit responsive to desired picture characteristics supplied by a user, said modifying means comprising a template matching neural network for selecting the optimized shutter speed setting and the optimized aperture setting when the light meter indicates the optimized picture characteristic is desired.

6. A teachable camera, comprising:

input sensors for focus, exposure, film speed, flash, motion and film type;

output units controlling flash, shutter speed, lens focus, aperture and filters;

a microprocessor connected to said input sensors and producing focus, shutter speed and aperture control signals;

a focus control template matching neural network connected to said microprocessor, said input sensor for focus and said output unit controlling lens focus, and modifying the focus control signals applied to said output unit for focus; and an aperture control template matching neural network connected to said microprocessor, said input sensor for focus and said output units controlling shutter speed and aperture, and modifying the shutter speed and aperture control signals applied to said output units controlling shutter speed and aperture.

7. A camera as recited in claim 6, further comprising learning means for altering said focus control template matching neural network and said aperture control template matching neural network responsive to a users desired picture characteristics.

8. A teachable camera, comprising:

input sensors for focus, exposure, film speed, flash, motion and film type;

output units controlling flash, shutter speed, lens focus and aperture;

a microprocessor connected to said input sensors and producing output unit control signals;

a neural network connected to said input sensors, said output units and said microprocessor, and directly controlling each of said output units responsive to learned picture characteristics and the control signals; and learning means for teaching said neural network to recognize the learned picture characteristics of a visual scene from the input sensors.

9. A camera as recited in claim 8, wherein said neural network is taught responsive to picture characteristics desired by a user.

10. A teachable camera, comprising:

input sensors sensing scene characteristics of a scene and producing scene characteristic signals;

output transducers controlling picture characteristics of a picture of the scene; and a neural network connected to directly said input sensors and said output transducers and directly controlling said output transducers responsive to the scene characteristic signals.

11. A method of teaching a camera how to take pictures with desired characteristics after manufacture of the camera, comprising the steps of:

(a) recording camera settings when a picture is taken after manufacture of the camera;

(b) eliciting responses from a user, after manufacture of the camera, concerning desired characteristics of the picture; and (c) supplying the settings and the characteristics to a neural network and teaching the neural network in the camera, using a teaching unit coupled to the network, to recognize the settings and change the settings responsive to the desired characteristics.

12. A teachable camera, comprising:

a focus sensor producing a focus value;

calculation means, connected to said sensor, for calculating a first focus control parameter setting responsive to the focus value;

a focus transducer for setting a picture focus; and a neural network, connected between said calculation means and said focus transducer, and producing a second focus control parameter setting different from the first focus control parameter setting responsive to a user's desired picture characteristics and the first focus setting and said focus transducer setting a picture focus responsive to the second focus control parameter setting.

13. A teachable camera, comprising:

a focus sensor producing a focus value;

calculation means, connected to said sensor, for calculating a first focus setting and a first flash setting responsive to the focus value;

a neural network, connected to said calculation means, and producing a second focus setting different from the first focus setting responsive to desired picture characteristics and the first focus setting producing a second flash setting different from the first flash setting responsive to the first flash setting and the desired picture characteristics a flash transducer connected to said neural network and setting a picture flash responsive to the second flash setting; and a focus transducer connected to said neural network and setting a picture focus responsive to the second focus setting.

14. A teachable camera, comprising:

an exposure control sensor producing an exposure value;

calculation means, connected to said sensor, for calculating a first shutter speed control parameter setting responsive to the exposure value;

a shutter speed transducer for setting a shutter speed; and a neural network, connected between said calculation means and said shutter speed transducer, and producing a second shutter speed control parameter setting different from the first shutter speed control parameter setting responsive to a user's desired picture characteristics and the first shutter speed setting and said shutter speed transducer setting the shutter speed responsive to the second shutter speed setting.

15. A teachable camera, comprising:
an exposure control sensor producing an exposure value;
calculation means, connected to said sensor, for calculating a first shutter speed setting, a first aperture setting and a first flash setting responsive to the exposure value;
a neural network, connected to said calculation means, and producing second shutter speed, aperture and flash settings different from the first shutter speed, aperture and flash settings responsive to the first shutter speed, aperture and flash settings and desired picture characteristics:
an aperture transducer connected to said neural network and setting an aperture opening responsive to the second aperture setting;
a flash transducer connected to said neural network and setting a picture flash responsive to the second flash setting; and
a shutter speed transducer connected to said neural network and setting a shutter speed responsive to the second shutter speed setting.

16. A teachable camera, comprising:
a film speed sensor producing a film speed value;
calculation means, connected to said sensor, for calculating a first shutter speed setting responsive to the film speed value;
a neural network, connected to said calculation means, and producing a second shutter speed setting different from the first shutter speed setting responsive to desired picture characteristics and the first shutter speed setting; and
a shutter transducer connected to said neural network and setting a picture shutter speed responsive to the second shutter speed setting.

17. A camera as recited in claim 16, wherein said calculation means produces a first aperture setting responsive to the film speed value, said neural network produces a second aperture setting responsive to the desired picture characteristics and the first aperture setting and said camera further comprising an aperture transducer connected to said neural network and setting an aperture opening responsive to the second aperture setting.

18. A teachable camera comprising:
a flash control sensor producing a flash value;
calculation means, connected to said sensor, for calculating a first flash setting responsive to the flash value;
a neural network, connected to said calculation means, and producing a second flash setting different from the first flash setting responsive to desired picture characteristics and the first flash setting; and
a flash transducer connected to said neural network and setting a picture flash responsive to the second flash setting.

19. A teachable camera, comprising:
a motion sensor producing a motion value;
calculation means, connected to said sensor, for calculating a first focus setting;
a neural network, connected to said calculation means, and producing a second focus setting different from the first focus setting responsive to desired picture characteristics and the first focus setting; and
a focus transducer connected to said neural network and setting a picture focus responsive to the second focus setting.

20. A teachable camera, comprising:
a film type sensor producing a film value;
calculation means, connected to said focus sensor, for calculating a first filter setting responsive to the film value;
a neural network, connected to said calculation means, and producing a second filter setting different from the first filter setting responsive to desired picture characteristics supplied by a user and the first filter setting; and
a filter transducer connected to said neural network and selecting a picture filter responsive to the second filter setting.

* * * * *